April 14, 1964 C. E. BROOKS ETAL 3,129,291

REMOTE DISTRIBUTED TELEPHONE LINE CONCENTRATOR

Filed Dec. 29, 1960 7 Sheets-Sheet 1

INVENTORS C. E. BROOKS
J. L. HENRY
BY
ATTORNEY

INVENTOR C. E. BROOKS
J. L. HENRY
BY
S E Hollander
ATTORNEY

REMOTE DISTRIBUTED TELEPHONE LINE CONCENTRATOR

Filed Dec. 29, 1960 7 Sheets-Sheet 3

INVENTORS C. E. BROOKS
J. L. HENRY
BY S E Hollander
ATTORNEY

REMOTE DISTRIBUTED TELEPHONE LINE CONCENTRATOR

Filed Dec. 29, 1960 7 Sheets-Sheet 4

INVENTORS C. E. BROOKS
J. L. HENRY
BY
S E Hollander
ATTORNEY

REMOTE DISTRIBUTED TELEPHONE LINE CONCENTRATOR

Filed Dec. 29, 1960 7 Sheets-Sheet 5

INVENTORS C. E. BROOKS
J. L. HENRY
BY S E Hollander
ATTORNEY

April 14, 1964 C. E. BROOKS ETAL 3,129,291

REMOTE DISTRIBUTED TELEPHONE LINE CONCENTRATOR

Filed Dec. 29, 1960 7 Sheets-Sheet 6

INVENTORS C. E. BROOKS
J. L. HENRY
BY S E Hollander
ATTORNEY

INVENTORS C. E. BROOKS
J. L. HENRY
BY
S E Hollander
ATTORNEY

United States Patent Office 3,129,291
Patented Apr. 14, 1964

3,129,291

REMOTE DISTRIBUTED TELEPHONE LINE CONCENTRATOR

Chester E. Brooks, Montvale, and James L. Henry, Madison, N.J., assignors to Bell Telephone Laboratories, Incorporated, New York, N.Y., a corporation of New York Filed Dec. 29, 1960, Ser. No. 79,384
22 Claims. (Cl. 179—18)

This invention relates to remote telephone line concentrators and more particularly to telephone line concentrators of the distributed type in which the component elements of the concentrator are distributed in the field in numerous physically distinct areas proximate to the location of the individual telephone subscribers.

In essence, remote line concentration refers to the grouping or "concentration" of a larger number of substation lines at a switching point remote from the central office from which a relatively smaller number of trunks is extended to the office. Thus the lines do not have individual direct access to the office but instead share common branches or trunks. The advantages of such an arrangement are outstanding and include a reduction in outside plant costs since each subscriber line need not be directly extended to the office as in prior direct line practice. Concentration ratios of 5 to 1 (lines to trunks) are not unusual and in view of the enormous monetary investment in outside plant the savings through concentration are proportionally significant.

Certain prior art concentrators have heretofore developed in prosaic fashion. Recognizing that the "concentration" of lines as such dates back to the earliest central offices in which incoming lines shared access to operator positions, intraoffice trunks, outgoing trunks, etc., a number of telephone technologists have fostered line concentrators under the influence of this historical practice. As a result certain prior art concentrators have been treated as though they were central offices in microcosm.

In short, the remote concentrator switching unit was adapted to house all of the necessary equipment at a centralized remote location. This practice, since it emulates traditional central office development, would appear to be an efficient and logical approach to remote line concentration. Nevertheless, though completely operative and useful, it is in part a self-defeative arrangement. This follows since the basic motivating purpose of line concentration is to avoid the existing burdensome requirement of connecting each subscriber line directly to the office. In overcoming this difficulty a number of prior art concentrators substituted an analogous hardship when using centralized remote line concentrators—each subscriber line was inexorably required to be connected to the centralized remote unit.

It is therefore an object of this invention to provide a line concentrator system for use with existing telephone switching systems in which it is unnecessary to connect each line to a centralized remote line concentrator.

An additional object of this invention is to provide a line concentrator system wherein the component elements of the remote concentrator are not "lumped" in a centralized unit but instead are distributed in the field with portions thereof proximate to the individual subscriber locations.

Another object of this invention is to provide a remote line concentrator having remote switching facilities of simple and economic design.

Perhaps one of the outstanding characteristics of a line concentrator that distinguishes it from a central office is the elementary realization that the individual subscriber line no longer is continuously connected to the central office. Instead, the concentrator substation is now electrically divorced from the office by the interposition of the concentrator switching equipment. Thus, the fundamental function necessary in all telephone switching systems—line supervision for on-hook, off-hook, etc.—becomes a challenging problem. In the past, a sensory device connected to a direct (nonconcentrated) line at the central office, such as a line relay, was immediately responsive to the switchhook conditions at the substation.

Certain prior art concentrators in bridging the gap between the substation line and the central office caused by the interposition of the remote concentrator have required continuous "dynamic" scanning of the substation line and continuous transmission of information derived from the scanning to the central office. In certain instances, the sophistication of the scanning arrangements may be of such degree as to significantly militate against the economic savings achieved through line concentration.

Moreover, a number of concentrators which utilize relatively efficient scanning arrangements in which information regarding line identification, service request, etc., is transmitted to the office, not continuously, but only when the necessity exists, themselves carry a number of disadvantages. The latter scanning arrangements are of the genre in which a multiplicity of code or number group conductors are utilized and each subscriber station is connected to an arrangement of number group conductors to uniquely identify the substation. In certain types of these arrangements when a substation goes off-hook, current is continuously applied to the appropriate individual code conductors and a detector circuit at the central office ascertains which particular conductors have been energized. Subsequently a translation is made of this information to identify the calling substation. This arrangement although operative and useful presents certain limitations on simultaneous or substantially simultaneous calls. Thus if a substation connected to code conductors 1 and 2 goes off-hook and substantially simultaneously a substation connected to conductors 2 and 3 goes off-hook, safeguards must be provided to insure that the spurious identification of a combination of conductors 1 and 3 is avoided.

In part, these safeguards may include a detector responsive to the first off-hook condition to reject all further subsequent off-hook or service request signals. This too is an operative procedure but the disadvantages thereof are immediate. In short, when a substation requests service no other substation may thereafter gain access to the control equipment of the concentrator in the central office until the original substation has had its service request fully processed to the extent of disconnecting the substation from the number group conductors and the closure of remote crosspoint contacts between the substation and the selected trunk.

A critical difficulty following from the mandatory delay in processing the second service request until the first service request is fully honored is that throughout the entire delay period the concentrator is exposed to the danger that a third calling substation which initiates a call a substantial time after the second but before the first call has been fully processed will confuse the identification procedure.

A short illustration will serve to depict the problem. If it is assumed that the substation connected to conductors 1 and 2 goes off-hook the number group detector in certain concentrator units will react to the energized condition of conductors 1 and 2 to identify the substation requesting service and to initiate connection of a trunk to that substation while at the same time blocking the entrance of any subsequent calls to the number group detector. In view of the high usage of certain concentrator lines, it is entirely possible that a second substation connected to number group conductors 2 and 3 may go off-hook a short period of time after the first substation has gone off-hook but subsequent to the action of the number group detector in blocking further access to itself.

No difficulty ensues at this time since the original identification cannot be confused in view of the blocking action of the number group detector. However, since all responses to service requests must be blocked until the substation connected to conductors 1 and 2 is disconnected therefrom, a third substation connected to conductors 3 and 4 may also go off-hook a substantial period of time after the second station has gone off-hook (perhaps 500 milliseconds), but prior to the completion of the processing of the first service request and the unblocking of the number group detector. The third substation is likewise denied access to the number group detector and cannot confuse the identification thereof, but now the ground work has been firmly laid for a possible spurious identification.

Thus, when the first substation is fully processed and disconnected from number group conductors 1 and 2, the existing conditions include the second station connected to number group conductors 2 and 3 and the third station connected to number group conductors 3 and 4. Current flows as a result in number group conductors 2, 3 and 4. Therefore, the number group detector is unable to perceive whether the combination representing the calling lines are 2 and 3 or 3 and 4 (valid), 2 and 4 or 3 and 4 (invalid)—a situation which could give rise to a spurious identification.

In fact, if means were available to avoid the spurious operation the disadvantage still remains that the subsequent calling substations are denied access to the number group detector even though the number group detector has performed its assigned function for the first or original calling substation until the first call has been fully processed. This is manifestly an inefficiency in view of the common or shared aspect of the number group detector and the need for its services by subsequent calling substations.

It is, therefore, an object of this invention to provide for the utilization of the number group detector by subsequent calling substations prior to the complete processing of the earlier calling substation.

Another object of this invention is to provide for immediate access to the number group detector upon the completion of the prior identification function.

A further object of this invention is to avoid the necessity of continuous signal current supplied by the substations to the number group conductors, and in lieu thereof to supply high intensity short duration pulse signals thereto.

It has been found in the use of certain prior concentrators that the remote crosspoints although capable of conveying normal speech currents cannot, by virtue of intrinsic limitations, carry the currents necessary for ringing the called substation. As a result, numerous expedients have been proposed for avoiding the necessity of transmitting the relatively high intensity, ringing currents through the crosspoints. Some alternatives have been proposed which are operative but involve additional expense. These include the use of tone generators at the called substation in lieu of a conventional ringer as described in Patent 2,850,650 of September 2, 1958, of L. A. Meacham.

It is therefore an object of this invention to provide facilities for conveying both speech and ringing currents through the remote concentrator switching equipment.

In view of the physical separation between the central office and the remote concentrator the problem of providing power to the remote unit in order to permit the latter to perform its assigned function presents a number of problems. For example, in certain prior art units, interruption of power supplied from the central office to the remote unit would result in the release of the switching crosspoints at the remote unit. To avoid this difficulty, a number of remote concentrators were arranged with a local battery power supply which ordinarily supplied the required power and was charged when necessary from the central office. This solution though simple and effective introduces the added costs of the local power supply and the maintenance therefor. The problem of a local power supply, moreover, is compounded many times when the remote concentrator unit is not situated in one centralized remote location, but is instead distributed throughout the field in relatively small portions proximate to the subscriber locations.

It is, therefore, an object of this invention to provide crosspoint equipment requiring no continuous power supply.

Still another object of this invention is to provide remote concentrator operation without the necessity of a remote power supply.

In certain prior art concentrator units, a problem existed with respect to substation lines which exhibited "permanent" conditions, e.g., tip to ring fault, substation off-hook (accidentally or intentionally), etc. In a concentrator arrangement, a line which is continuously in the off-hook condition represents a major problem. The reaction of the concentrator equipment to a permanent condition is unfortunately the same as a legitimate service request call. Thus, the permanent condition is recognized only as a service request and apparatus is initiated to extend a connection to the "calling" substation line. Ultimately, a trunk is connected to the line to effectuate a connection between the substation and the central office. In line concentrators of the so-called universal type, in which the concentrator is designed for compatibility with the more prevalent existing switching systems, the equipment functions to join the concentrated substation with its corresponding individual termination at the central office, i.e., the termination to which the line would have been connected if it were directly connected to the office. The extension of the substation line to the office line termination is made over a concentrator trunk.

As in other legitimate service request calls, the subscriber substation is connected to an originating register (No. 5 crossbar) or a subscriber sender (No. 1 crossbar) in anticipation of receiving dialed information from the substation, and dial tone is transmitted by the register to the substation.

Of course, in the case of a permanent condition, no dialing takes place. Ultimately, the conventional central office equipment "times out." After a predetermined interval, during which no dialing has occurred, the central office recognizes that a permanent condition exists and frees the sender in the No. 1 crossbar system (or originating register in the No. 5 crossbar system) from its seizure by the line which latter is then transferred to a "permanent signal" trunk. This trunk transmits a distinctive tone to the called substation with the purpose presumably being to signal the subscriber to return the receiver to the on-hook condition.

It is important to recognize that in conventional operation the only essential equipment which remains occupied is the substation line itself, since the sender has been released, and the permanent signal trunk performs its literal function.

In the case of a concentrator, however, the gravity of the situation is more pronounced since the concentrator trunk which was used to connect the subscriber to the register or sender in the central office itself, now remains occupied—even though it is transferred to the permanent signal trunk. Thus, the service available to concentrator subscribers is immediately degraded. In fact, during peak load conditions, when all other concentrator trunks are occupied, the continued seizure of the concentrator trunk to connect a substation having a permanent condition to the permanent signal trunk may prevent access to the concentrator trunk by other would-be callers with legitimate service requests. The inconvenience to the subscribers with legitimate service requests who are denied access to this trunk is compounded even further by the fact that the subscribers cannot be given the usual busy tone since all trunks are obviously occupied, and no channel is available to deliver this information. Instead, they are provided "dead" lines.

In addition to undesirable service degradation, other operating difficulties are presented. Thus, a number of prior concentrators required that efforts to free a concentrator trunk from the seized condition be made at the remote location. The inconvenience and expense attached to such a procedure is manifest and need not be detailed. However, it should be pointed out that this type of difficulty (the lack of capacity to cope with permanent service request conditions from the central office location) is a self-compounding burden. This results from the fact that, in addition to actually journeying to the remote concentrator location to perform the necessary operations to free the concentrator trunk and to block further spurious service requests by the line, maintenance personnel must retrace the entire route when it becomes necessary to restore the line to a service condition after the fault has been removed.

It is, therefore, an object of this invention to provide for the release of trunks which have been seized as a result of permanent or fault conditions on concentrator lines.

Still another object of this invention is to prevent the subsequent reseizure of a trunk by a faulty line or a line having a permanent condition thereon.

These and other objects of this invention are accomplished in an illustrative embodiment incorporating a remote line concentrator which utilizes a plurality of separate "line package" or individual switching elements unique to the substation lines and physically located in a plurality of distinct areas proximate to the actual substations. A multiplicity of coding or number group conductors, a number group return lead and a release conductor are extended in the field to each of the lines to be connected to the concentrator. In addition, an appropriate number of speech or communication paths are also extended into the field to each of the substation lines. Access by a particular station to the central office is provided through the line package which includes facilities for connecting a line to a selected speech trunk in response to control signals from the central office. Additionally, each line package provides for the connection of a unique arrangement of number group conductors to each line in a code representative of the substation line identity. Moreover, each line is also connected to a common number group return lead and to a common release conductor.

The crosspoints in each package are arranged to connect the tip and ring conductors of the respective line to the corresponding tip and ring conductors of each of the speech trunks to which the line has access.

A service request call, evidenced by a substation going off-hook, initiates a momentary signal pulse on the associated number group conductors to which the service requesting substation is connected. These conductors are connected to a number group detector at the central office to determine the identity of the calling substation. It is significant to note that the information delivered from the line package to the central office indicative of a service request is not a continuous application of potential as in certain prior arrangements but in lieu thereof is a group of pulses simultaneously applied to each of the number group conductors. Thus, the pulses arrive at the number group detector in the central office in parallel, a single pulse on each actuated number group conductor. A "call start" magnetic reed relay at the line package is energized to provide the desired service request pulse, as explained in detail herein.

As a result of the identification procedure at the central office, arrangements are made to connect the calling substation to one of the speech trunks that extends to the central office. The crosspoints between the speech trunks and the substation line are energized by marking signals applied over selected number group conductors and the selected trunk conductors. In the illustrative embodiment the crosspoints are magnetic reed relays arranged to latch in the operated condition when once operated precluding the need for additional power drain.

An additional magnetic reed number group relay also having latching capabilities is included at each line package. Normally, this relay has its contacts closed to provide a connection between the substation line and the control or number group conductors. However, during a conversation connection, when the crosspoints have been operated, this relay which serves in part as the traditional "cut-off" relay isolates the line from the sensory equipment (number group conductors and number group detector) thereby to provide the desired "clean" tip and ring—a connection free of shunting impedances.

In the illustrative embodiment the remote line concentrator is shown in combination with equipment adapted to provide compatibility with a standard No. 1 crossbar telephone system with minimal encroachment or modification of the latter system.

Subsequent to the conversation connection, the connection between the substation line and the trunk may be disestablished by transmitting selective impulses over the tip of the trunk and the release conductor thereby to release the magnetic reed crosspoints and to re-establish the connection between the line and the sensory equipment in the package by reclosing the contacts of the magnetic reed number group relay.

In the present arrangement, a service request condition at a first substation excites the number group conductors only momentarily. When the number group detector identifies the calling substation, as described above, the central office equipment initiates the extension of a channel to the calling subscriber. In the interim, however, (during the extension of the connection), the number group detector is released. As a result, a subsequent service request by a second substation can be processed by the number group detector and the second service requesting substation be identified. In response to the latter operation the line relay (the conventional existing line relay) in the No. 1 crossbar office individual to the calling substation line will be energized. Again, the number group detector will be freed. Further service requests will likewise be identified and the corresponding line relays unique to the calling substation lines will be actuated. Moreover, these line relays will be operated even though the initial call has not yet been fully processed, that is, even though the central office equipment is still engaged in completing a connection through the crosspoints to the calling substation.

In view of the relatively rapid release of the number group detector after each identification function, and in further view of the relatively short duration service request pulses, the exposure of the system to the possibility that more than the appropriate number group detectors will be energized is minimized. In addition, the efficiency of the system in responding to the service request condition of subscribers who place calls in rapid succession is markedly augmented.

Another advantageous aspect of the present invention includes facilities available in the event of a permanent condition on a concentrator line such as a line off-hook condition, to release the trunk which the line has seized and, moreover, to deny access by the line to any other trunk. These facilities include means for releasing the trunk relay individual to the seized trunk, thereby to initiate a routine disconnect operation, and additional equipment for blocking the re-operation of the existing conventional line relay in the crossbar office individual to the faulted line. By so doing, the fault condition cannot thereafter give rise to another reseizure of a trunk. The facilities for accomplishing this function are all internal to the central office equipment, and do not require any action at the remote location. Furthermore, when the permanent condition at the substation line is terminated, the line may be fully restored to service by simply re-enabling the line relay in the central office, also without the necessity of physical effort at the remote location.

A feature of this invention is a remote line package element of a distributed telephone line concentrator including switching and control equipment individual to a subscriber's station and located proximate to that station.

A further feature of this invention is the use of magnetic reed relays having latching qualities as the remote crosspoints between lines and trunks.

Still another feature of this invention includes a magnetic reed number group relay or cut-off relay at the line package for isolating the substation from the sensory equipment in the line package.

Still another feature of this invention is a number group or cut-off relay utilizing a double wound magnetic reed relay having latching facilities.

Still another feature of this invention is a pulse generation circuit adapted to be energized by a call start relay in response to a service request condition at one of said substations.

A further feature of this invention includes release equipment for selectively releasing particular line package crosspoints.

Another feature of this invention includes crosspoint relays utilizing twin magnetic reeds for connecting the tip and ring conductors of each substation to the tip and ring conductors of each trunk accessible to that substation and further facilities for concurrently releasing all of said package crosspoints.

A feature of this invention includes facilities for releasing a trunk which has been seized in response to a permanent off-hook condition at a concentrator substation.

An additional feature of this invention includes arrangements for preventing the reseizure of a trunk by a line having a fault or permanent condition thereon when the trunk which had previously been seized is released.

Still another feature of this invention includes facilities for selectively operating particular line package crosspoints from the central office.

Still another feature of this invention includes facilities for applying marking potentials to both tip and ring conductors of the trunk.

Another feature of this invention includes translation facilities for operating a selected conventional line relay unique to the concentrated substation line in accordance with unique combinations of operated translation relays.

These, and other objects and features of the invention may be more readily apprehended from an examination of the following specification, appended claims and attached drawing in which:

Figure 1A:
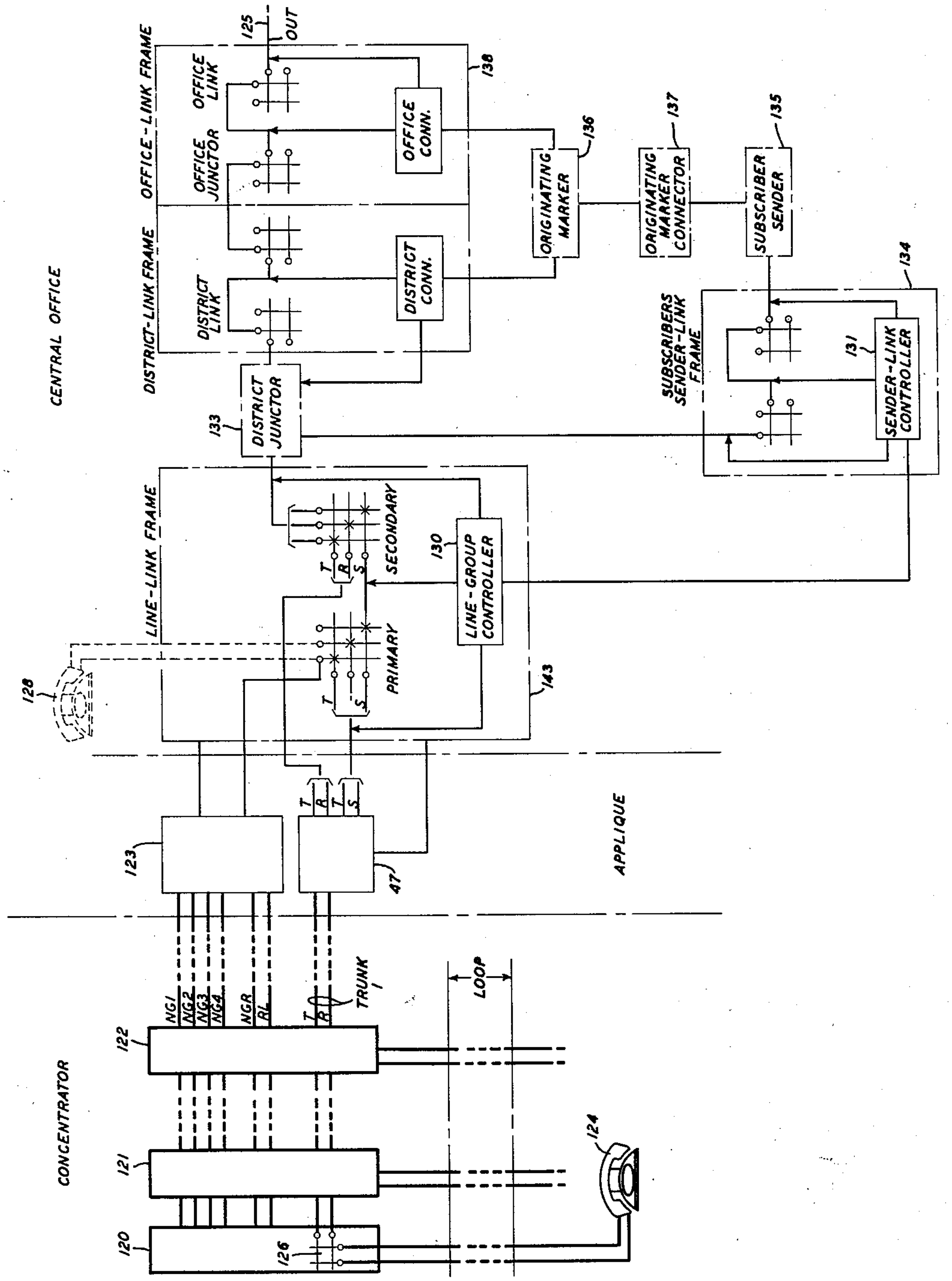
FIG. 1A shows an outline drawing of the invention in combination with a conventional number 1 crossbar telephone office when a call originates at the remote concentrator.
Figure 1B:
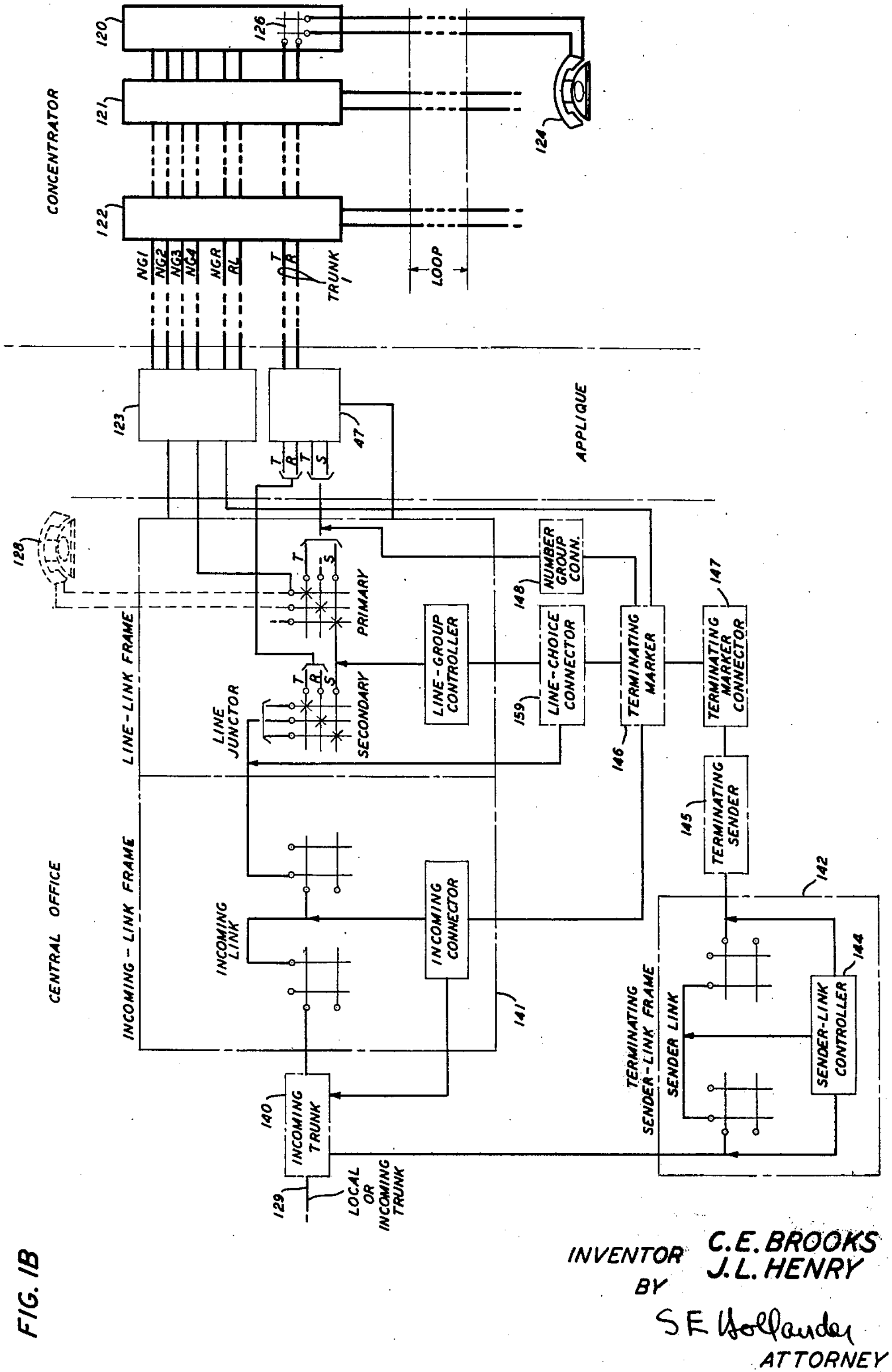
FIG. 1B illustrates in outline form a combined arrangement including the distributed concentrator during the processing of a terminating call to a concentrated line.
Figure 2:
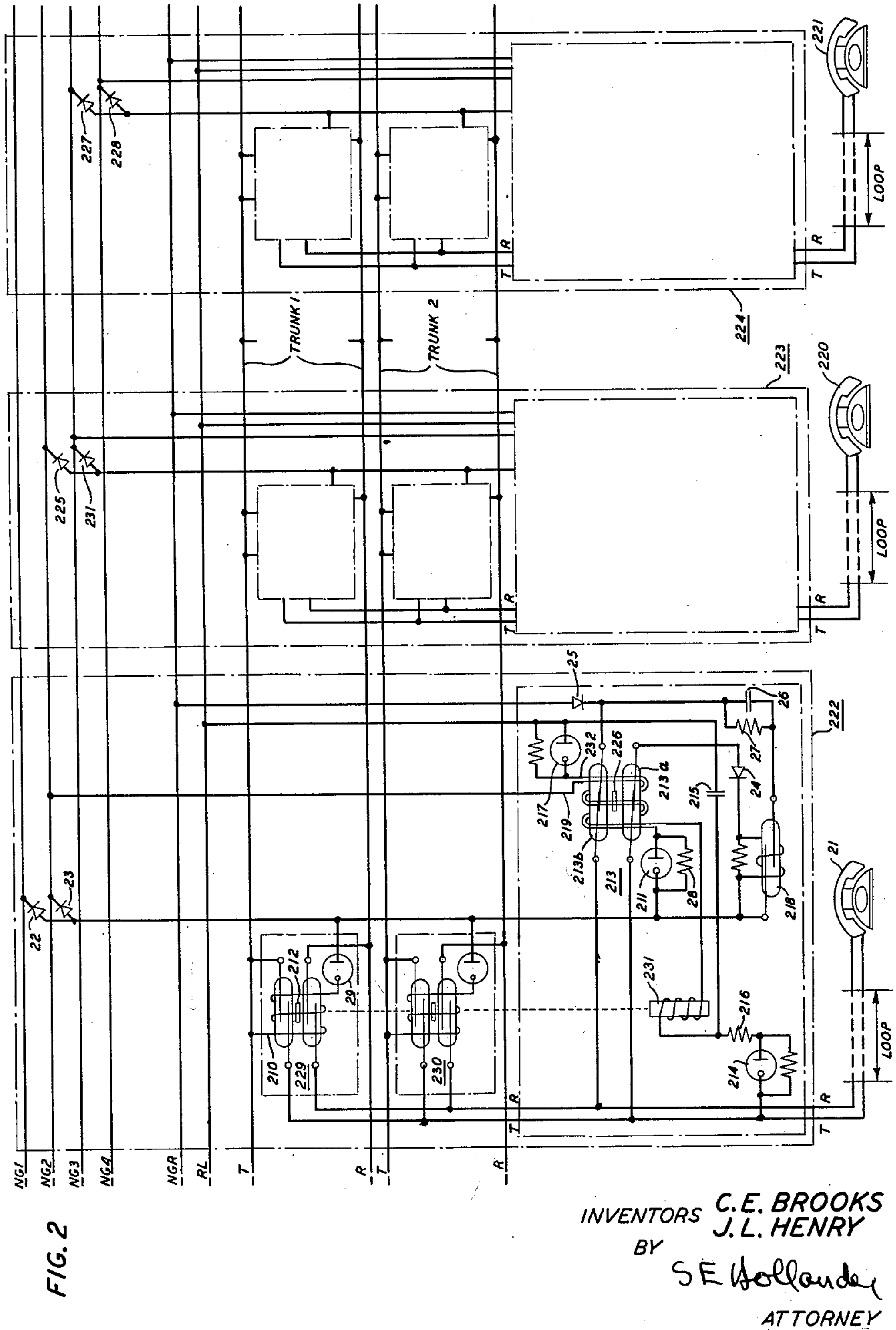
Figure 3:
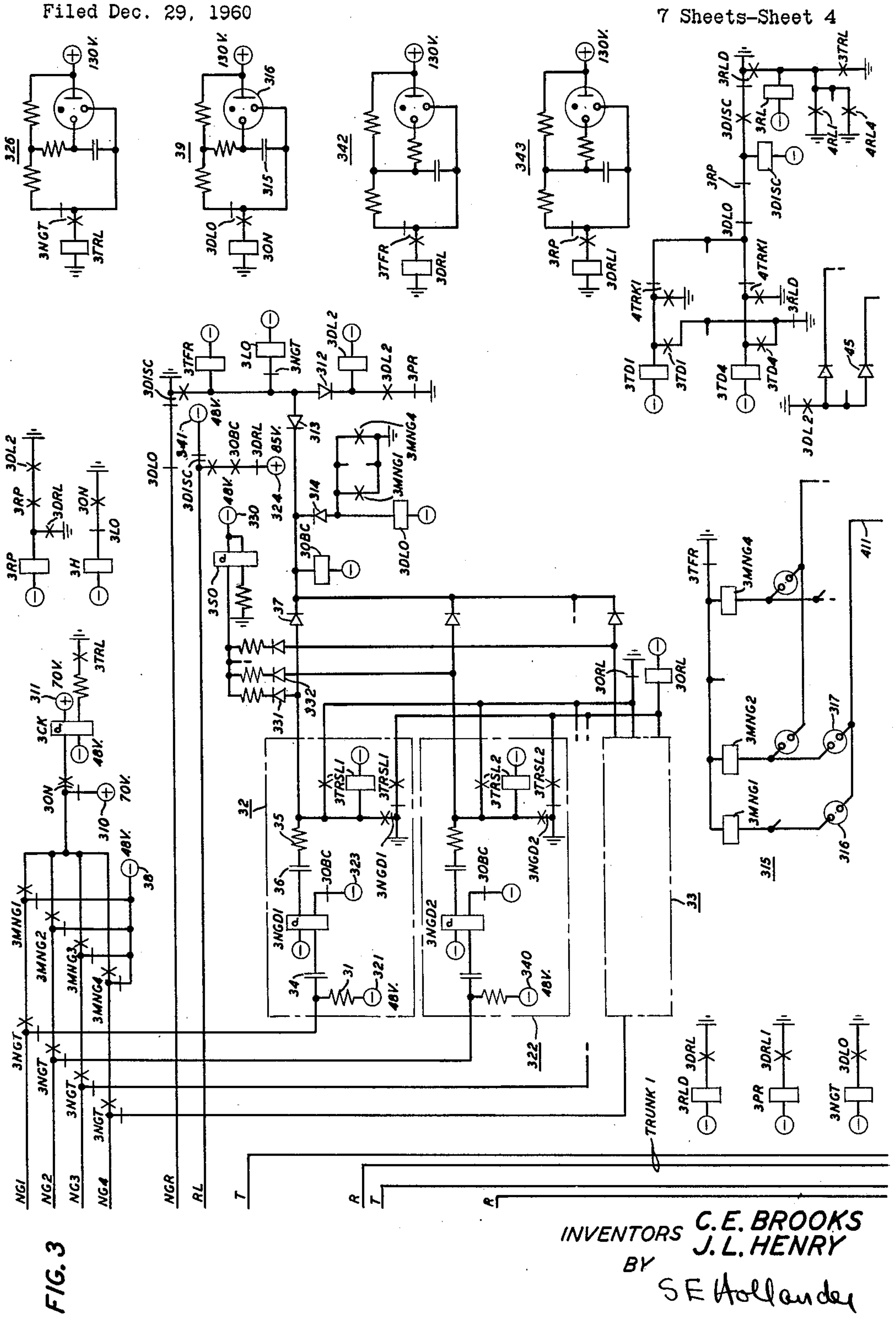
Figures 4, 5:
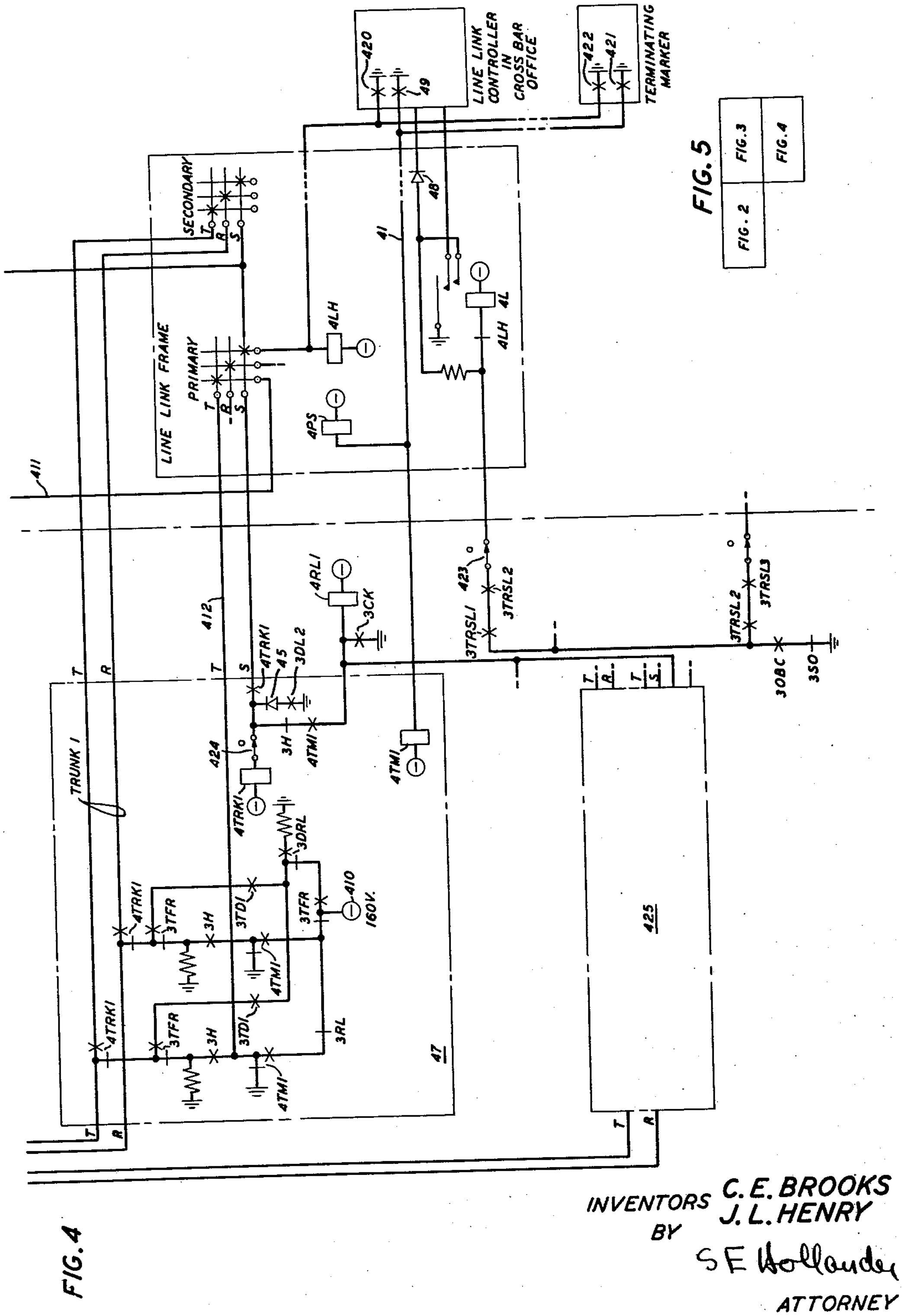
Figure 6:
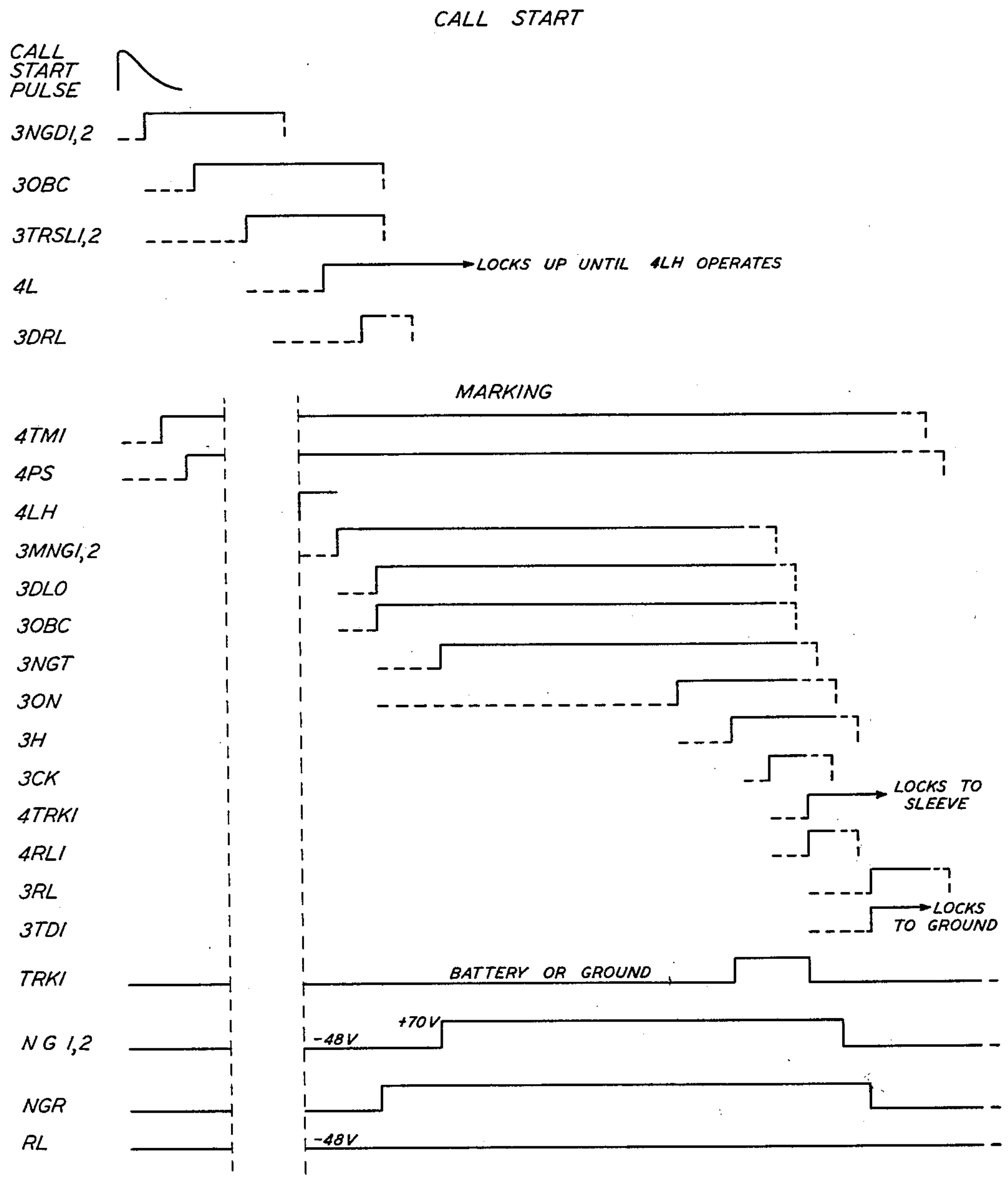
Figure 7:
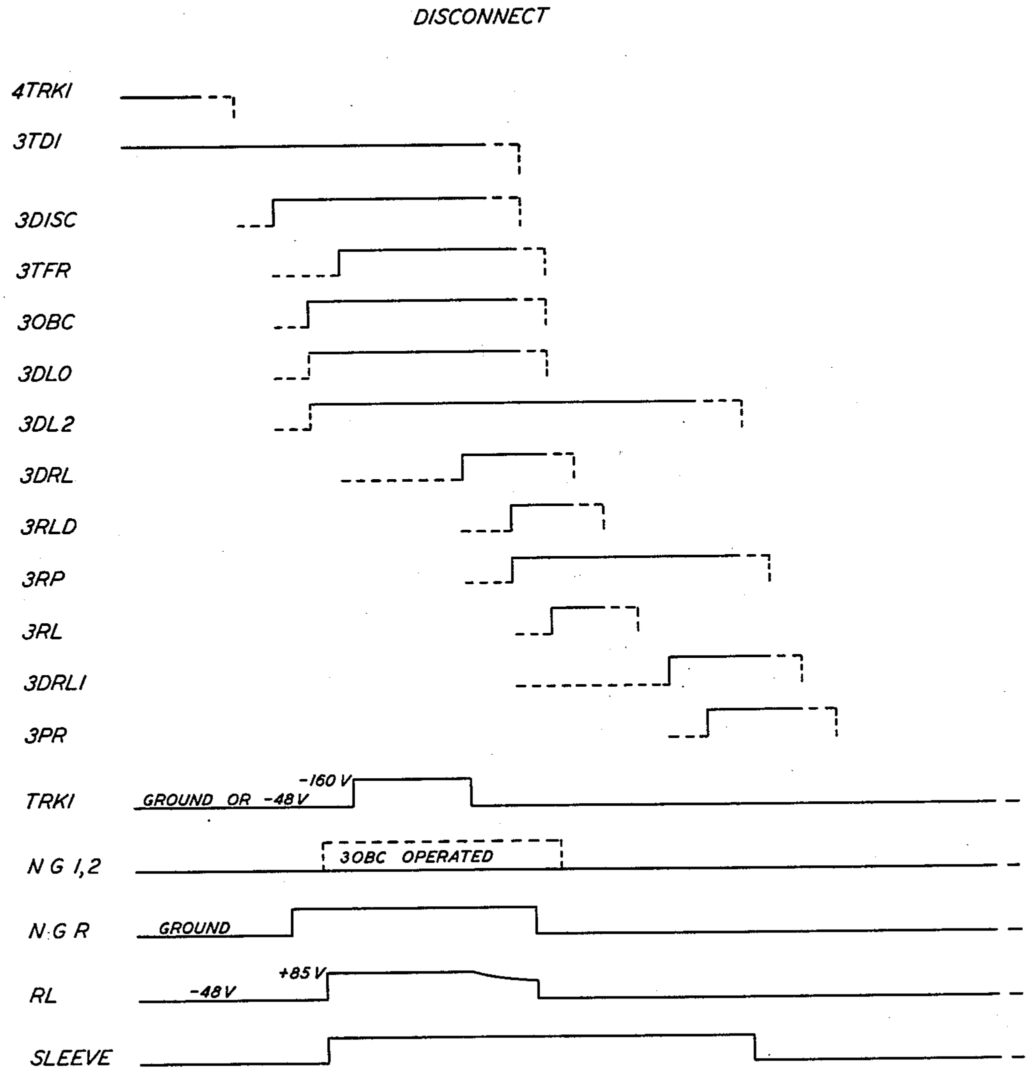

FIGS. 2–4 indicate the detailed structures of the equipment shown in outline form in FIGS. 1A and 1B wherein these structures have been added to or modified;

FIG. 5 shows the advantageous arrangement of FIGS. 2–4 for disclosing the present invention;

FIG. 6 shows a relay timing sequence for the call start function and the marking function; and FIG. 7 indicates the relay timing sequence for the disconnect function.

Appropriate and continuing reference to FIGS. 6 and 7 will be helpful in following the operation of the circuitry of FIGS. 2–4.

GENERAL DESCRIPTION OF OPERATION—ORIGINATING CALL

In accordance with a particular illustrative embodiment of the present invention, a distributed line concentrator is shown in conjunction with a conventional No. 1 crossbar system. In essence, the structure of the No. 1 crossbar equipment is undisturbed. As a result, the present concentrator may be classified as a "universal" type. As shown in FIG. 1A, the concentrator includes a group of packages 120, 121 and 122. These packages are individual to the substations. An applique circuit at the central office, including control facilities 123 and trunk termination 47, is shown in outline form in FIG. 1A, and in detail in FIGS. 3 and 4. The conventional No. 1 crossbar equipment is shown in dotted outline in the central office. It will be observed that the points of junction between the trunk and the central office equipment include the horizontal channel of the secondary crossbar switch in the line link frame. Although the line relays (conventional existing line relays) in the central office are not shown, it is understood that an individual line relay is provided in the central office unique to each concentrated substation line. This aspect is shown in detail at line relay 4L in FIG. 4.

The manner of entrance by the concentrator substation 124 into the central office on an originating call is via the line relay. In part, this has been done intentionally in order to preserve the structural integrity of the No. 1 crossbar office and to enhance the universality of the concentrator. To facilitate comprehension of the detailed description which follows, it will be useful here to briefly outline the advantageous manner in which the distributed line concentrator is operated in combination with the No. 1 crossbar system. For preservation of clarity, only those aspects of the operation of the No. 1 crossbar system which are useful in understanding the present invention are included. For a comprehensive description of the operation of the No. 1 crossbar system in establishing an originating call, reference may be made to Patent No. 2,235,803 of W. W. Carpenter of March 18, 1941.

FIG. 1A is an outline diagram of the line concentrator apparatus as combined with the No. 1 crossbar office during an originating interoffice call from the concentrator. The line packages 120, 121 and 122 are each connected to two of the four number group leads NG1–NG4 in accordance with a code described further herein. Each of the packages is connected moreover to a common or number group return lead NGR and a common release lead RL.

A number of speech trunks, of which trunk 1 is shown as representative, are also connected to each of the line packages. The number group leads terminate at the central office in an applique circuit 123 which is used for identifying substations which are originating service requests and for other control operations explained further herein.

It is manifest from the drawing that the trunk conductors T and R extend from the horizontal level of a secondary crossbar switch in the line link frame.

In describing the operation of the invention, it will be assumed that a party at substation 124 is seeking to effect a connection through the central office to a distant subscriber. When substation 124 goes off-hook, current flows through particular number group leads connected through line package 120 to substation 124 as explained in detail herein. Thus, current flows through number group leads NG1 and NG2 to which substation 124 will, for the purposes of this illustration, be assumed to be connected. It will be noted, as shown in FIGS. 2–4, that the remaining packages are each connected to other unique combinations of the number group leads NG1–NG4 to specifically identify those packages and the lines (not shown) connected thereto.

The current which flows in number group leads NG1 and NG2 as a result of the off-hook condition at substation 124 is detected at the central office in applique circuit 123 as explained in detail herein, and an identification of the calling substation is made through a translation of the number group leads carrying current.

Although not shown in FIG. 1A, it will be seen herein that package 120 includes equipment for generating a single relatively short duration high intensity identifying pulse on number group leads NG1 and NG2. This identifying pulse is detected in equipment shown in detail in FIG. 3 and indicated generally in FIG. 1A at applique circuit 123. In addition, applique circuit 123 includes facilities responsive when a number of service request pulses are simultaneously received from different line packages to preclude identification of any of the service requesting lines.

To continue with the operation the result of the identification of the calling line is the operation of a line relay (not shown in FIG. 1, but shown in detail in FIG. 4), which is uniquely associated with the calling substation line.

In response to the operation of the line relay, the line group controller 130 and the sender link controller 131 are energized. These controller circuits select district junctor 133, sender link 134 and sender 135 and operate the necessary select and hold magnets to establish these connections. As indicated above, detailed descriptions of these operations are disclosed in Patent No. 2,235,803.

After the operation of the line relay, arrangements are undertaken in circuit 123 to effect a connection to the substation by applying a marking potential to the number group leads NG1 and NG2 unique to that substation and by simultaneously applying a marking potential to the tip conductor of the selected trunk. A crosspoint 126 is energized by the marking potentials as explained herein, and a path is extended from substation 124 through crosspoint 126, trunk 1, trunk termination 47 to the secondary crossbar switch of the line link frame 143 at the central office.

When the subscriber sender 135 is connected to the line, it transmits dial tone to the calling subscriber and accepts and records the digits dialed at substation 124.

The subscriber sender 135 has access to an originating marker connector 137 to select an idle originating marker 136 which then receives the information dialed by the calling subscriber into the subscriber sender 135.

In accordance with routine procedure, the marker determines from the called office code the location of the corresponding trunk group on the output of the office link frame 138 and selects an idle trunk 125 in the proper group and then establishes paths through the district link and office link frames for connecting the district junctor 133 to the selected outgoing trunk 125. When these functions have been performed the marker 136 operates the appropriate select and hold magnets to close the crosspoints and establish the connection to outgoing trunk 125. The sender 135 then transmits the called line number to the terminating office and the connection is extended to the calling party. This completes the connection on an originating call from a substation 124 through the distributed concentrator and the No. 1 crossbar office to the called terminating office. For perspective in analyzing the distinction between lines conventionally connected to the No. 1 crossbar office and the manner in which a concentrated line is given access to the office, the manner in which a direct connected or conventional substation would have been connected to the line link frame is shown in dotted outline. Thus, a conventional line would extend from the tip and ring conductors on the verticals on the line link frame to substation 128 (the prior art direct connected substation line).

In the present invention the tip and ring vertical conductors are not used for connection to the line and do not extend into the field. As will be shown herein, a conductor connected to the tip vertical of the primary switch is used for identification purposes but that conductor remains wholly within the central office, and is merely extended to applique unit 123 as shown. As a departure from previous practice, the present arrangement contemplates that the tip and ring horizontals T and R on the secondary of the line link frame are extended out to the field through termination 47 and are connectable to each of the line packages as trunk 1.

GENERAL DESCRIPTION OF OPERATION—TERMINATING CALL

Referring now to FIG. 1B, it will be assumed that a call is to be extended from the incoming trunk 129 through the No. 1 crossbar office, and the distributed concentrator to substation 124.

It will be noted that incoming trunk 129 terminates at incoming trunk circuit 140. The incoming trunk circuits appear on the horizontals of the incoming link frame 141 as shown and also on the horizontals of the terminating sender link frame 142. The incoming link frame 141 and the line link frame 143 collectively form the terminating network for completing the call through the crossbar office.

The sender link controller circuit 144 establishes a path from the incoming trunk 140 to a terminating sender 145 through a crossbar link similar to that in which the line group controller circuit 130, discussed for FIG. 1A above, operates. When the terminating sender 145 is connected to the incoming trunk circuit 140 it receives the called line number over an interoffice trunk from the originating office, and when the complete number has been registered, connects to a terminating marker 146 through a terminating marker connector 147. The terminating sender 145 then transfers the record of the called substation number to the terminating marker 146 which, in turn, selects an idle path from incoming trunk circuit 140 to the line link horizontal to which termination 47 is connected. In essence, No. 1 crossbar office is internally "unaware" of the fact that the called subscriber is not directly terminated at the office, and seeks to establish a horizontal channel to the line. The marker determines on which line link frame the line is "located" through the number group connector 148 and connects to the desired line link frame through the line choice connector 159. The originating office sender is then released when the record of the called number has been passed to the terminating sender 145. The marker makes a called line busy test as on a nonconcentrator call, and if substation 124 is idle (sleeve conductor is at minus 48 volts) the marker extends the incoming trunk circuit through the incoming link 149 and line junctor 150 to the horizontal on which trunk 1 is terminated. Equipment in terminating circuit 47 and applique circuit 123 are then actuated to uniquely identify the number group leads associated with called substation 124 and to apply marking potentials to the number group leads and to the tip conductor of trunk 1 to operate crosspoint 126. The incoming trunk circuit 140 applies ringing current to the called line, and when the call has been answered maintains supervision in the usual manner.

Substation 128 again shows in dotted outline, the manner in which a substation would be connected to the line link frame 143 in accordance with prior art procedures. Here again, the extension of the horizontal level of the secondary of the line link frame as trunk 1, in effect, extends the crosspoints into the field where they appear in a multiplicity of physically separated areas contiguous to the individual substations such as crosspoint 126 at substation 124.

Although not shown in FIGS. 1A and 1B, the package circuitry 120 shown in FIG. 2, as explained in detail herein, includes facilities for remaining permanently "latched" when either operated or released—thereby obviating the need for continuous holding current.

For a detailed description of the operation of the equipment shown in FIG. 1B in "dot-dash" outline, reference may be made to Patent 2,089,921 of W. W. Carpenter of August 10, 1937.

GENERAL DESCRIPTION OF MAJOR COMPONENTS

Referring now to FIG. 2, a group of substations 21, 220 and 221 are shown. Line packages 222, 223 and 224 individual to these substations are indicated for connecting the substations to the central office. For purposes of clarity of description, the number of substations, trunks and packages, etc., have all been minimized although it is apparent that the principles involved in the operation of a greater number of substations and trunks is identical.

Four number group conductors NG1–NG4 extend from the central office of FIGS. 3 and 4, and are connected to each of the substations 21, 220 and 221 in accordance with a prearranged code. In this manner each substation and line package is connected to an individual and distinct set of number group leads over diodes 22, 23, 225, 231, 227 and 228. A common return conductor NGR is connected to each of the line packages as is a common disconnect or release conductor RL.

Each of the substations, for example substation 21, is connectable to each of the trunks over a balanced path including, in the case of trunk 1, the upper and lower contacts of relay 229. This establishes a metallic connection between the tip conductor T of the loop and the tip conductor T of the trunk and the ring conductor R of the loop and the ring conductor R of the trunk. A separate pair of reed crosspoints is available for connecting the substation to each of the trunks to which it has access. Thus, the reed contacts of relay 230 are used for connecting substation 21 to the tip and ring contacts of trunk 2. Each of the pairs of contacts of relays 229, 230, etc., is equipped with permanent magnetic latching facilities shown, for example, at magnet 212 which are effective in maintaining the reeds continuously in the position to which they are operated by winding 210 and coil 231.

This is advantageous in the case of a remote concentrator since the energy expended in operating the crosspoint 229 to connect substation 21 to trunk 1 is only momentary. Thereafter, the crosspoint contacts of relay 220 will remain closed indefinitely without further power drain.

Release coil 231 is common to all of the pairs of reed relays associated with a particular line. Coil 231 is excited only when it is necessary to release the contacts in a crosspoint at which time (as indicated by the dotted vertical line in FIG. 2) the coil exerts an influence on all of the reed crosspoints collectively, thereby opening any crosspoints previously operated. A further pair of reed elements which are individual to the line package are shown at 213*a* and 213*b*. These include contacts which are used in conjunction with the operation or release of crosspoints 229, 230, etc., and serve at least in part, in the role of the traditional cut-off relay. Thus, when crosspoint 229 is operated, as described in detail herein, to connect substation 21 to trunk 1, relay 213 is actuated to divorce substation 21 from its connection to the number group conductors NG1, NG2 and NGR. Under these conditions, substation 21 is granted access to the central office over a "clean" metallic path, that is, a path which is free of bridging or shunting impedances. Relay 213 is hereinafter sometimes referred to as the number group relay in view of its role in connecting and disconnecting substation 21 from the number group and number group return conductors. It will be noted that relay 213 also is equipped with permanent magnet latching features as shown by magnet 226.

Another major component in the package circuit 222 includes call start relay 218. This relay is also a reed relay though it differs from the others since no latching facilities are included. The function of the call start relay is to deliver a relatively short duration pulse on the number group conductors connected to a particular substation in response to a service request condition thereon. As explained in detail herein, capacitor 26 connected to call start relay 218 is utilized to control the pulse duration as a function of the charge time of the capacitor. Thus, although call start relay 218 remains operated, the current delivered over the number group conductors by capacitor 26 is only momentary.

Although line package 222 has been shown in detail, and packages 223 and 224 are shown in outline form, it is understood that the latter packages contain identical equipment.

At the applique circuit in the central office, the number group conductors individually terminate in number group detector relays 3NGD1–3NGD4. The latter relays are responsive to pulses received on the number group conductors to operate translation relays 3TRSL1–3TRSL4, respectively. The contacts of the latter relays, in turn, are connected in a coded arrangement individual to each of the substation lines for operating a line relay uniquely representative of the substation line. In the embodiment the contacts of relays 3TRSL1 and 3TRSL2 operate relay 4L, the same line relay to which substation 21 would have been connected if it were directly connected to the central office.

In this respect line relay 4L is representative of the remaining line relays, not shown, which are the conventional existing line relays in the No. 1 crossbar central office. The manner of connection of the contacts of translation relays 3TRSL1 and 3TRSL2 to the existing line relay 4L is shown in part to indicate the universality of the instant invention. Since the applique circuit connects to the existing line relay the degree of disruption of existing No. 1 crossbar equipment to provide compatible operation with the instant concentrator is minimal.

In addition, the line relay, once operated, presents a unique mark to the central office equipment to initiate routine prior art functions in the central office to extend a connection to the horizontal of the crossbar switch on the line link frame to which the central office "believes" the calling line to be connected.

Instead, as shown in FIGS. 1A and 1B, the calling line is not connected to the vertical on the primary crossbar switch, and instead the horizontal channel of the secondary is extended into the field as a concentrator trunk.

Here again, a further desirable feature of the instant invention is manifested. The linkage between the central office equipment and the concentrator is such that when the central office proceeds routinely to establish a connection to the horizontal channel and operates the select magnet 4PS and line hold magnet 4LH in accordance with the above-referred-to patents, equipment in the applique circuit responsive to these routine operations is effective to extend the horizontal channel into the field and to effectuate a vertical connection at the remote location between the trunk and the appropriate line package. It will be seen in the following detailed descriptions that the intelligence necessary for performing the latter operation is vested in the concentrator equipment rather than the central office equipment—again indicating the noninterference with existing central office equipment.

A trunk termination circuit 47 is shown for connecting trunk 1 to the horizontal level of the secondary crossbar switch in the line link frame. Termination 425 shown in outline form, serves an identical purpose with respect to trunk 2.

Other essential components of the applique circuit include the number group translator 315 which is shown illustratively as a gas tube translator and functions through a connection to the tip vertical on the primary crossbar switch of the line link frame. Since, as indicated heretofore in the description of FIGS. 1A and 1B, the vertical path on the primary crossbar switch is individual to a substation line, the tip conductor of the vertical is uniquely representative of the line identification and may be utilized to obtain a translation of the line identification. In this respect it will be observed that at least two translations are performed in the applique circuit and they serve to relate the identity of the calling substation in the concentrator (concentrator number) to its corresponding identity in the central office (No. 1 crossbar equipment number). Thus, the tip crosspoint conductor of the primary crossbar switch is uniquely representative of substation 21 in the No. 1 crossbar office and indicates the equipment number of substation 21 in the No. 1 cross bar office. Translator 315 performs a translation whenever necessary between the equipment number of substation 21 as indicated by its position in the line link frame to the "concentrator number"—i.e., the coded arrangement by which substation 21 is connected to code conductors NG1–NG4. In this respect the operation of relays 3MNG1 and 3MNG2 is related to the connection of line package 222 to number group conductors NG1 and NG2.

A translation which is equivalent to a translation in the opposite direction is performed by the translation relays 3TRSL1–3TRSL4. These relays are responsive to the concentrator number of substation 21 to identify the equivalent equipment number in the No. 1 crossbar office.

It will be observed that although four number group conductors are shown as illustrative, a greater number may be utilized, for example, eight conductors and connections to the line package may be on a three-out-of-eight basis instead of a two-out-of-four basis, as shown, thereby affording a larger number of possible combinations.

A further significant component in the applique circuit is shown at relay 3SO. This relay is connected over its lower winding to a biasing supply from potential source 330. The upper winding of the relay is connected over individual diodes 331, 332, etc. to each of the number group detector relays 3NGD–. Current flow through the number group detector relays in response to a service request pulse generated by call start relay 218 will produce a proportional current through diodes 331, 332, etc., and the upper winding of relay 3SO. This current is designed to oppose the current through the lower winding. Moreover, in the illustrative embodiment current flow through two of the diodes 331, 332 is collectively insufficient to overcome the biasing current through the lower winding and operate relay 3SO. However, current flow through a number of diodes greater than two is designed to operate relay 3SO thereby precluding operation of any of the line relays, such as relay 4L, in view of the contacts of relay 3SO in series with the operating paths of the relays. This is a significant feature as will be explained herein with respect to the occurrence of simultaneous service request calls. Thus, if substations 21 and 220 should go off-hook precisely simultaneously, no spurious identification can be made since the reaction at the applique circuit is, in effect, to reject both service requests.

In this respect, it will be observed from the detailed description which follows that both substations will be denied access to the trunks until one of the parties "flashes" his switchhook contacts thereby releasing and reoperating call start relay 218 to generate a fresh service request pulse. As indicated herein, the fact that substation 220 remains connected to the number group conductors during the "flashing" sequence is of no consequence. Moreover, also as indicated in detail herein, the remaining substation 220 will thereafter be granted access to an idle trunk, even though the subscriber thereat takes no further action and does not "flash" his own switchhook. Briefly, the latter function is accomplished by a regeneration technique explained herein which is effective to open the number group return conductor NGR at the contacts of relays 3DLO and 3DISC during the setting up of a connection and a disconnect operation, respectively. Interruption of the number group return conductor NGR momentarily releases the call start relay associated with substation 233 to regenerate a further service request for that substation.

A trouble timing circuit 326 in the applique is used when a crosspoint is, for any reason, not operated within a predetermined period of time to automatically initiate a release function thereby freeing the concentrator applique equipment for other calls.

It will be observed that the applique circuit is equipped with arrangements for precluding continued unwarranted seizure of a concentrator trunk by a substation line having a fault or permanent condition thereon. This function will be explained in detail herein and is shown symbolically by manual switch 424 in series with relay 4TRK1 and manual switch 423 associated with line relay 4L individual to substation 21. It will be observed herein that the operation of manual switch 423 blocks out further seizure of a concentrator trunk by a faulted line whereas the momentary actuation of switch 424 immediately releases concentrator trunk 1 for access by legitimate service request calls.

Having thus described the components of the invention a description of the operation of the equipment follows.

DETAILED DESCRIPTION—ORIGINATING CALL

It will be assumed for illustrative purposes that a subscriber at substation 21 is initiating a service request. When the substation goes off-hook, the switchhook contacts (not shown) are closed in subset 21 and a path is completed over the loop from negative battery at source 321, resistance 31, contacts of relay 3NGT, number group conductor NG1 to diode 22. A similar path may be traced from negative battery 340 in number group detector 322 connected to number group conductor NG2 over the contacts of relay 3NGT and to diode 23. From the junction of the anodes of diodes 22 and 23, the circuit is further extended to the winding of reed relay 218, diode 24, contacts of reed element 213A, tip conductor T of the subscriber's loop, subset 21, ring conductor R of the subscriber's loop, contacts of element 213B, diode 25, number group return conductor NGR, contacts of relays 3DLO, 3DISC to ground in the applique circuit at the central office. This path, when completed, results in the operation of call start relay 218, in view of the current flow through the winding thereof.

After the contacts of call start relay 218 are closed, a pulse of current is delivered through capacitor 26, in view of the sudden low impedance path through diode 25, capacitor 26, and the contacts of relay 218 to diodes 22 and 23. As capacitor 26 charges, a current pulse is applied to number group conductors NG1 and NG2 to which diodes 22 and 23 are connected. Moreover, the current pulse is delivered through the contacts of relay 3NGT and capacitor 34, lower winding of relay 3NGD1, contacts of relay 3OBC to source 323. Relay 3NGD1, the number group detector relay, operates. In a similar manner, number group detector relay 3NGD2 operates as a result of the current pulse over number group conductor NG2. In essence, the information which has been transmitted to the central office represents the fact that a combination of number group conductors (NG1 and NG2) unique to the calling substation 21 has been energized. This intelligence (concentrator number) is adequate to permit identification of the calling substation at the central office.

Operation of relays 3NGD1 and 3NGD2 causes the operation of translation relays 3TRSL1 in number group detector 32 and 3TRSL2 in number group detector 322 over the contacts of relays 3NGD1 and 3NGD2, respectively. A path is now available to the upper winding of relay 3NGD1 over the contacts of relay 3NGD1, including resistance 35 and capacitor 36. The latter RC combination comprises a time delay release circuit in which the current flow through resistance 35 and the upper winding of relay 3NGD1 decreases as capacitor 36 charges until polarized relay 3NGD1 releases. It will be observed that the current flow through the lower winding of relay 3NGD1 is in pulse form and has also terminated. Relay 3NGD2 reacts similarly.

The operation of the translation relays 3TRSL1 and 3TRSL2 are, in part, controlled by relay 3ORL. Thus, relay 3TRSL1, for example, would ordinarily release after the release of the number group detector relay 3NGD1. However, the contacts of relay 3ORL provide an additional holding path over the contacts of relay 3TRSL1 until relay 3ORL is operated. Thus, the effect to relay 3ORL is to increase the operated time of relay 3TRSL1 by the time required to operate relay 3ORL.

Relay 3OBC operates over a path including the contacts of relay 3NGD1 and diode 37. A similar path extends over the contacts of relay 3NGD2. The contacts of relay 3OBC interrupt the operating path through the lower winding of relay 3NGD1 to preclude response to any further service request pulses received immediately subsequent to those generated by substation 21.

After the operation of translating relays 3TRSL1 and 3TRSL2, a unique path is completed for the operation of line relay 4L which is the existing conventional line relay in the No. 1 crossbar telephone office individual to substation 21. The path for the operation of relay 4L may be traced from ground, contacts of relays 3SO, 3OBC, 3TRSL1, 3TRSL2, switch 423, contacts of hold magnet 4LH, winding of relay 4L to negative battery. Operation of relay 4L completes a hold path for itself over its own contacts and the contacts of relay 4LH. In addition, a ground or start signal is delivered to the controller circuit in the crossbar office over diode 48.

In response to the operation of line relay 4L, the No. 1 crossbar system is operated in the routine manner outlined in FIG. 1A. Thus, the line group controller 130 and a sender link controller 131 are energized to select an idle district junctor, sender link and sender and the necessary select and hold magnets to establish the connection are operated.

When the line link primary select magnet 4PS is operated in the conventional manner (as disclosed in the above-referred-to patents) relay 4TM1 is operated in parallel therewith. For clarity of presentation, the operation is shown symbolically by actuation of contacts 49 in the controller circuit in the crossbar office.

At this time, hold magnet 4LH is also operated by suitable apparatus in the No. 1 crossbar office shown here symbolically by the operation of contacts 420 in the control circuit.

*Marking of Number Group Conductors*

Operation of relay 4TM1 which is unique to the selected horizontal group (and trunk) causes a marking potential to be applied to the number group translator 315 over a path from potential source 410, contacts of relays 3TFR, 3RL, 4TM1, tip conductor T (412) of the link, tip crosspoints of the primary switch, conductor 411, gas tubes 316 and 317 in parallel, relays 3MNG1 and 3MNG2, contacts of relay 3TFR to ground. This results in the operation of relays 3MNG1 and 3MNG2, to prepare to apply a charging potential from source 310 to number group conductors NG1 and NG2 uniquely representative of substation 21. Thus, a path may be traced from source 310, contacts of relay 3ON, contacts of relays 3MNG1 and 3MNG2 in parallel, to the contacts of relay 2NGT connected to number group conductors NG1 and NG2.

In the interim, relay 3DLO is operated over the contacts of relays 3MNG1 and 3MNG2 (the latter not shown). Operation of relay 3DLO causes the operation of relay 3NGT over an obvious path. The latter relays extend the charging potential to conductors NG1 and NG2. Operation of relay 3DLO also initiates the operation of a time delay circuit for the operation of relay 3ON.

The 70-volt potential from source 310, may now be traced to diodes 22 and 23 at the remote package individual to substation 21. Moreover, a negative 48-volt potential from source 38 is applied over the contacts of unoperated relays 3MNG– to all other number group conductors.

The potential of 70 volts may further be traced from number group conductor NG2 through winding 219 of relay 213, resistance 28, to gas tube 29. The purpose of the charging potential from source 310 is to establish a stable 70-volt potential in the number group conductors prior to marking.

Relay 3ON, meanwhile, operates at the contacts of relay 3DLO, when capacitor 315 charges to a sufficient level to ionize the control gap and in turn cause ionization of the main gap of tube 316. Operation of relay 3ON causes the transfer of the 70-volt marking potential source from source 310 to source 311 through the upper winding of relay 3CK. In addition, the contacts of relay 3ON complete a path including the contacts of relay 3LO for the operation of relay 3H.

The latter relay in operating, results in the connection of negative 160-volt potential to tip and ring conductors T and R of trunk 1. This path may be traced in the case of the tip conductor T from negative 160 volts at source 410, contacts of relays 3TFR, 3RL, 4TM1, 3H, 3TFR, 4TRK1, to the tip conductor T of trunk 1. A path may similarly be traced to the ring conductor over the contacts of relays 3TFR, 4TM1, 3H, 3TFR and 4TRK1. The negative 160-volt potential applied to the tip conductor of trunk 1 extends through winding 210 of crosspoint relay 229 to the left electrode of gas tube 29. As indicated above, the other electrode of tube 29 is subjected to a positive 70-volt potential over resistance 28 and winding 219 via conductor NG2. This produces a substantially 230-volt potential across gas tube 29, which conducts. A negative going pulse, is, therefore, applied to the cathode of gas tube 211 of substantially minus 90 volts (i.e. minus 160 volts, less a 70-volt drop across gas tube 29). Since the anode of the tube 211 was previously shown to be at a positive 70-volt potential over winding 219, tube 211 also fires.

A path is now provided for the operation of relay 3CK, which may be traced from plus 70 volts at source 311, upper winding of relay 3CK, contacts of relays 3ON, 3MNG2, 3NGT, number group conductor NG2, winding 219, tube 211, tube 29, winding 210, tip conductor T of trunk 1, contacts of relays 4TRK1, 3TFR, 3H, 4TM1, 3RL, 3TFR to negative 160 volts at source 410. As the current develops in windings 210 and 219, the crosspoint contacts of relay 229 are closed and latched under the influence of permanent magnet 212 and the contacts of relay 213, previously closed, are now opened as a result of current flow through winding 219.

Closure of the contacts of relay 229 provides a connection between substation 21 and the tip and ring conductors of trunk 1. Moreover, the substation circuit is now disconnected from the number group conductors and the number group return lead NGR as a result of the opening of the contacts of elements 213A, 213B, thereby providing a "clean" tip and ring connection from the remote circuit to the central office.

At the central office, relay 3CK operates over its upper winding when the current through windings 210 and 219 builds to a sufficient level. Operation of relay 3CK completes a path for the operation of relay 4TRK1 from ground, contacts of relays 3CK, 4TM1, 3H, switch 424, winding of relay 4TRK1 to negative battery.

Operation of relay 4TRK1 transfers the tip and ring conductors of trunk 1 to the tip and ring of the link connected to the secondary of the crossbar switch in the line link frame and in addition divorces the trunk tip and ring conductors from the applique circuitry. Relay 4TRK1 locks operated over its own contacts, switch 424 and the sleeve link S to the ground applied to the sleeve conductor in the controller circuit.

This completes the connection to a calling substation on an originating call and the subscriber will ultimately be connected to a subscriber sender in the No. 1 crossbar office, in accordance with routine procedure generally described for FIG. 1A above. The subscriber sender transmits dial tone to the calling subscriber.

When the called party's directory number is registered in the central office, in response to dialed information from substation 21, routine control actions are initiated in the No. 1 office to effect a connection to the called party.

DETAILED DESCRIPTION—TERMINATING CALL

It will now be assumed that a terminating call is being initiated to substation 21.

The terminating marker in establishing an incoming call to the called line (as discussed above for FIG. 1B), selects an idle channel through the crossbar switches to the horizontal group of the line link frame on which the called line would have appeared if it were directly connected to the central office. (See FIG. 1B.) The primary select magnet 4PS and line hold magnet 4LH, unique to substation 21, are operated in a conventional manner to enable circuits, described further herein, to mark the proper line at the concentrator.

More specifically, the terminating marker, after making a directory to equipment number translation, extends a ground connection (shown symbolically by actuation of contacts 421) to operate select magnet 4PS on the line link frame (and applique relay 4TM1).

Another ground connection is extended over contacts 422 to operate the line hold magnet 4LH. Thus far the operation is routine in the sense that the central office "believes" that it is completing the connection since the called line is ordinarily connected to a vertical on the primary crossbar switch. Instead, as demonstrated above, the horizontal channel of the secondary crossbar switch is extended into the field as a trunk and the vertical connection is made through reed relays in the remote location. Specifically, when the vertical magnet 4LH is operated, a negative 160-volt potential is applied from source 410 to the number group translator 315 over a path including contacts of relays 3TFR, 3RL, 4TM1, tip conductor 412, tip contacts of the primary crossbar switch, conductor 411 to diodes 316 and 317, which ionize and permit the operation of relays 3MNG1 and 3MNG2 over the contacts of relay 3TFR.

Operation of relays 3MNG1 and 3MNG2 causes the operation of relay 3DLO over an obvious path. A marking operation is then executed in a manner similar to that described above for an originating call. As a result, the contacts of relay 229 are operated to connect trunk 1 to substation 21 and the contacts of relay 213 are opened. When crosspoint 229 is closed, current flow through the number group conductors causes the operation of relay 3CK in the manner disclosed above for an originating call. Operation of relay 3CK results in the operation of relays 4RL1 and 4TRK1. Relay 4RL1 causes the operation of relay 3RL which removes the negative 160-volt potential from the number group translator 315.

Subsequent operations thereafter are similar to those described above for an originating call. Since this is a terminating call, however, ringing current is applied in the conventional manner from the No. 1 crossbar equipment.

DETAILED DESCRIPTION—DISCONNECT OPERATION

When the conversation is completed, the release cycle is initiated when the subscriber returns the receiver to its cradle and the switchhook contacts are opened. Conventional supervisory equipment in the No. 1 crossbar office (trunk supervisory relay—not shown) senses the decrease in current flow in the trunk circuit and initiates apparatus which routinely releases the connection by removing the ground condition from the sleeve conductor S extending through the primary and secondary crossbar switches. As a result, relay 4TRK1 releases in view of the opening of the holding ground.

When relay 4TRK1 releases, a circuit is completed for the operation of disconnect relay 3DISC over a path from ground, contacts of relays 3RLD, 3TD1 (previously operated over the contacts of relay 4TRK1), 4TRK1, 3DLO, 3RP, winding of relay 3DISC to negative battery. Relay 3DISC locks operated over its own contacts and the contacts of relay 3RLD to ground. Operation of relay 3DISC completes a path for operation of relay 3TFR over an obvious circuit. In addition, relays 3LO and 3DL2 are operated over the same path including, in the case of relay 3LO, the contacts of relay 3NGT and, in the case of relay 3DL2, diode 312. At this time, the contacts of relay 3DISC divorce the number group return lead NGR from ground. The significance of this function in opening the number group return lead and thereby releasing any call-start relay similar to relay 218 will be elaborated herein.

Relay 3DL2, in operating, locks to ground over its own contacts and the contacts of relay 3PR. In addition, relay 3DL2 applies a ground potential over its own contacts and diode 45 to the sleeve conductor. This ground condition on the sleeve prevents any incoming calls from being set up before the disconnect circuit has completed its function. It also prevents any other trunks from disconnecting until after this disconnect in progress has completed its cycle.

As indicated above, relay 3TFR has operated at the contacts of relay 3DISC. This operation prevents the actuation of any relays 3MNG—in view of the contacts of relay 3TFR in series therewith.

Moreover, relay 3TFR applies negative 160-volt potential to the tip and ring conductors of trunk 1 over a path from source 410, contacts of relays 3TFR, 3DRL, 3TD1, 3TFR, 4TRK1 to the ring conductor R. A similar path may be traced to the tip conductor T. Continuing over the tip conductor T of the trunk, the negative 160-volt potential extends through the upper contacts of relay 229 to the cathode of tube 214.

After the operation of relay 3DISC, negative 48-volt potential is removed from release conductor RL at source 341 and instead a positive 85-volt potential is applied to that conductor from source 324 over the contacts of relays 3DRL, 3OBC and 3DISC.

Relay 3DRL is operated by timing circuit 342 a predetermined interval after the operation of relay 3TFR when the capacitor in timing circuit 342 charges to a sufficient level to permit conduction in the gas tube. When relay 3DRL operates, the positive 85-volt potential previously referred to is removed from release conductor RL at the contacts of relay 3DRL.

In the interim, however, as a result of the application of the positive potential from source 324 over conductor RL, a path is available over capacitor 215 and resistance 216 to the anode of tube 214. Since, as indicated above, a negative 160-volt potential is applied to the cathode, tube 214 ionizes and conducts. As a result, current flows through capacitor 215 to charge that capacitor to a voltage approaching 175 volts. This difference in potential is attributable to the positive 85-volt potential on conductor RL, and the negative 90-volt potential from tube 214 (minus 160 volts on the tip conductor T less the 70-volt drop through tube 214). When capacitor 215 charges to a sufficient level, to ionize tube 217, the tube conducts. It is seen that tube 217 has its cathode conducted through winding 232, winding of coil 231 to the left electrode of capacitor 215. The anode of tube 217 is connected to the other side of the capacitor.

When tube 217 conducts, a path is available through the winding of coil 231 which includes the tip conductor T, upper contacts of relay 229, tube 214, resistance 216, winding of coil 231, winding 232, tube 217 to the release conductor RL. This path persists until the tip contacts of relay 229 (upper contacts) are opened as a result of current flow through coil 231 which serves to open any operated contacts in relays 229, 230, etc. However, another path for the continued energization of coil 231 and coil 232 exists even thereafter as capacitor 215 discharges over a circuit including coil 231, winding 232 and tube 217. Thus, coil 231 and relay 213 are energized by capacitor 215 for a further sufficient period to insure full release of all of the contacts of relays 220, 230, etc., and full closure of the contacts of elements 213A, 213B.

In view of the opening of the contacts of relays 229 and 230, etc., the line is separated from the trunk connection, and in view of the closure of the contacts of elements 213A, 213B, the line package is reconnected to the control conductors NG1, NG2 and NGR and restored to the normal service observing condition—whereby the number group conductors act as sensory devices.

In the interim, at the central office, when relay 3DRL operates as described above, relay 3RP operates over an obvious path and locks operated over its own contacts and the contacts of relay 3DL2. Relay 3RLD now operates over the contacts of relay 3DRL and relays 3DISC and 3TD1 release at the contacts of relay 3RLD. Relay 3TFR releases as the result of the release of relay 3DISC.

Relay 3DRL1 operates a predetermined time interval after the operation of relay 3RP as determined by the parameters of timing circuit 343. Relay 3PR operates over the contacts of relay 3DRL1. Relay 3DL2 releases when relay 3PR operates. When relay 3DL2 releases the ground condition is removed from the sleeve horizontal associated with trunk 1 over diode 45 and the disconnect function is completed.

DISABLING LINE RELAY IN RESPONSE TO PERMANENT CONDITION ON LOOP

In the event of a permanent line off-hook condition, a number of advantages of the instant invention may be invoked. Thus, it is desirable to avoid the condition in which a trunk to the central office is continuously seized in response to a line off-hook condition of a "permanent" nature, either intentionally or unintentionally. Since this condition is particularly crucial in the case of line concentrators, in view of the denial of access to the seized trunk by other lines with legitimate service requests, it is desirable to be able to preclude its continuance.

The arrangement for preventing continued seizure of a trunk by a line with a permanent condition thereon is shown in FIG. 4 symbolically by the use of switches 423 and 424.

When a line is "permanently" off-hook, the No. 1 crossbar office, in a conventional manner, ultimately transfers the line to an intercept or permanent signal holding trunk. This is done when the subscriber fails to dial information after a predetermined waiting period or "time-out" in the subscriber sender of the No. 1 crossbar office.

Ultimately, depending on the length of continuance of the off-hook condition, the situation is brought to the attention of maintenance personnel in a routine manner. In response to the permanent off-hook condition, the crossbar office and applique circuit have already extended a channel to the off-hook substation as described for a legitimate service request.

It will be assumed for illustrative purposes that trunk 1 has been marked to substation 21 in response to the permanent off-hook condition at that substation. To remedy the difficulty and prevent continued seizure of trunk 1, switch 424 is momentarily operated to release relay 4TRK1. Release of the relay 4TRK1 simulates to the applique circuit the initiation of a disconnect function in the same manner that the release of that relay as a result of the removal of ground condition from the sleeve lead would have done conventionally as described above. As a result, the disconnect function is initiated in the manner explained to release crosspoint 229 which joins the substation 21 to the tip and ring conductors of the trunk and to reclose number group relay 213.

The operation of switch 424 is only momentary in order that relay 4TRK1 may be reclosed in response to other legitimate calls.

However, prior to any actuation of switch 424, as described above, switch 423 is first opened. Switch 423 prevents relay 4L from being reoperated in response to a further "service request" from substation 21. In fact, continued "service requests" will emanate from substation 21 as a result of the regeneration technique explained herein although a trunk cannot be seized since relay 4L cannot be operated. This prevents initiation of a connection function in the controller circuit of the crossbar office. Thus, further spurious "service requests," whenever they appear from substation 21, will be ignored.

Although the operation of switches 424 and 423 are shown symbolically, it is understood that the manner in which the trunk relay 4TRK1 may be released may take other forms including equipment responsive to the transfer of trunk 1 to the permanent condition trunk in the central office, timing arrangements, etc. In addition, it is understood that the operation of the line relay 4L may be blocked by other means including mechanical means.

REGENERATION OF SERVICE REQUEST SIGNAL

Under certain instances, a subscriber may go off-hook during a time interval which coincides with the disabling of the number group detectors as a result of the operation of relay 3OBC during the number group detector function. In addition, a subscriber may go off-hook concurrently with the process marking on terminating or originating calls. In any one of these instances, the number group conductors are preempted for other purposes. In view of the momentary nature of the service request signal by the calling substation, the pulse may terminate or be "lost" prior to the re-enabling of the number group detector circuit.

To cover this contingency, the present arrangement advantageously provides for recapturing and in effect regenerating any service request pulses which may have so occurred. The manner in which this is done is determined by the operation of relay 3DLO on the setup of an originating or terminating call and by relay 3DISC in the event of a disconnect function after completion of conversation.

It will be assumed for purposes of illustration, of a regeneration function that substation 21 has initiated a service request pulse during an interval when, for any of the above reasons, the number group detector relays 3NGD were disabled.

If, for example, substation 21 was denied access to the number group detector as a result of occupation by the latter with another prior calling subscriber, the subscriber of substation 21 remains connected through his package to the number group conductors but no further request signal is transmitted over these conductors. However, when relay 3DLO is operated during the marking function relative to the marking of a trunk to the previous calling subscriber (and specifically as a result of the operation of relays 3MNG– during the marking function), the number group return conductor NGR is opened. Ultimately, when the 160-volt potential at source 410 is interrupted by the release relay 3RL, the path of relays 3MNG– is interrupted and any operated relays 3MNG– release. At this time, the contacts of relay 3DLO in the number group return conductor NGR are reclosed.

However, during the interval that the contacts of relay 3DLO were open and the number group return conductor was disconnected from ground potential, the call start relay 218 previously operated at substation 21 was released. The closure of the contacts of relay 3DLO in series with the number group return conductor NGR reestablishes the path for the operation of the call start relay 218, which now regenerates a momentary service request pulse during the charge time of capacitor 26 over the number group conductors NG1 and NG2. This regenerated service request is now received by the number group detectors 3NGD1 and 3NGD2 and is operated upon in a manner similar to that described above in an originating call sequence.

An analogous regeneration of the service request pulse at substation 21 is performed during a disconnect function when relay 3DISC is operated, upon the release of the trunk relay 4TRK1, in the manner described hereinabove, for a disconnect operation. It is apparent that the opening of the contacts of relay 3DISC in series with the number group return conductor NGR causes the release of call start relay 218 (or any other call start relay previously operated) for the time when the disconnect relay 3DISC is operated. Ultimately, when relay 3DISC is released during the usual disconnect function, the number group return conductor NGR is again connected to ground and the call start relay 218 will be re-operated to regenerate any service request condition that may have been "lost" theretofore.

*Simultaneous Service Request Calls*

It will be noted that the upper windings of relays 3NGD1, 3NGD2, etc. are all connected in parallel through diodes 331, 332, etc., to the upper winding of relay 3SO. The lower winding of relay 3SO is connected to potential source 330 to provide a biasing current therethrough.

The function of the circuitry including relay 3SO is to preclude response to the energization of an excessive number of number group conductors.

Assuming, for example, that substations 21 and 220 go off-hook precisely simultaneously, the call start relays 218, etc. will deliver pulses of current through diodes 22, 23, 225 and 231 thereby energizing number group conductors NG1, NG2 and NG3.

This gives rise to the possibility of a spurious indication of a substation uniquely associated with conductors 1 and 3. To offset this possibility, relay 3SO is designed to operate when current flows through more than two diodes 331, 332, etc., indicating an abnormal number of detector relays 3NGD1, 3NGD2, etc. have been operated. Manifestly, when relay 3SO is operated, the line relay 4L for substation 21 and all other line relays are precluded from operating in view of the normally closed contacts of relay 3SO in series therewith. Since no line relay can operate, a false connection is precluded even though substations 21 and 220 have gone off-hook precisely simultaneously.

Thereafter, if the subscriber at substation 21 flashes his switchhook contacts his call start relay will be momentarily released and reoperated to deliver the usual pulses on conductors NG1 and NG2. This time, since only two conductors have been energized, relay 3SO will not be operated and a connection will be extended to substation 21 in accordance with the usual procedure described above.

Moreover, the subscriber at substation 220 will automatically be granted a connection to the central office as a result of the regeneration technique described above. Thus, during the marking operation for substation 21, the call start relay (not shown) of substation 220 will be automatically released when the contacts of relay 3DLO are opened in the number group return conductor NGR. When the call start relay for substation 220 is again actuated (on release of relay 3DLO) number group conductors NG2 and NG3 will be energized to operate the number group detector relays 3NGD2 and 3NGD3 (the latter not shown) which as usual through the translation relays 3TRSL2 and 3TRSL3 extend a connection to the line relay associated with substation 220—even though the switchhook contacts at substation 220 have not been flashed by the party thereat.

In like manner, a number of simultaneous calls greater than two will cause the operation of relay 3SO to preclude response to any request and the first party to flash his switchhook contacts will be granted service although the regeneration technique if more than two parties remain connected will again cause the operation of relay 3SO. This situation will continue until all of the parties except one have either disconnected or flashed their switchhooks. The last party will be automatically granted a connection in the manner described above.

*Trouble Timing Circuit*

Timer 326 is used as a general timing circuit to advance the cycle of operations in the applique circuit if the timing relay 3TRL operates over the contacts of relay 3NGT prior to the release of relay 3NGT at the contacts of relay 3DLO. If relay 3TRL operates the contacts thereof actuate relay 3CK over the lower winding thereof which in turn initiates the release of the marking circuit as described above.

It is understood that the above embodiments are merely illustrative and that various modifications may be made by those skilled in the art without departing from the spirit and scope of the invention.

What is claimed is:

1. A remote line concentrator system including a telephone central office, a first and second plurality of trunks extending from said office, a greater plurality of substations remote from said office and from each other, individual switching units disposed adjacent to said substations, means in said switching units for connecting said substations to said first plurality of trunks under control of said central office, magnetic reed relay means in said switching units responsive to a service request condition at one of said substations for applying a unique group of pulses to said second plurality of trunks indicative of the identity of the service requesting substation, and a capacitor timing circuit in serial connection with said relay means for timing the application of said unique group of pulses to said second plurality of trunks.

2. A telephone line concentartor system including a telephone central office, a first plurality and a second plurality of trunks extending in parallel from said office, a greater plurality of substations remotely located from said office and from each other, a plurality of individual concentrator switching units disposed contiguous to said substations, means in said switching units for connecting said substation to said first plurality of trunks under control of said central office, additional means in said switching units connecting said substations to coded arrangements of said second plurality of trunks, means in said units responsive to a service request condition at one of said substations for applying a distinctive group of pulses to said second plurality of trunks, first relay means at said central office responsive to said pulses for identifying said service requesting substation, and second relay means at said central office responsive to said first relay means for extending the operated time of said first relay means in response to said pulses by a period proportional to the time to operate said second relay means.

3. A remote line concentrator system including remote crosspoints for connecting a substation over a selected idle trunk to a central office comprising first and second magnetic reed elements, permanent magnet means adjacent to said elements for maintaining said elements operated or released indefinitely, winding means on said elements, and magnetic reed relay means connected in series with said winding means and effective in response to a service request condition at said substation for transmitting a distinctive group of pulses representative of said substation to said central office.

4. A remote line concentrator system including a telephone central office, a first and second plurality of trunks extending from said office, a greater plurality of substations remote from said office and from each other, individual switching units disposed adjacent to said substations, means in said switching units for connecting one of said substations to a selected one of said first plurality of trunks under control of said central office and for connecting said substations to said second plurality of trunks in accordance with a code, and means at said central office responsive to a permanent signal condition at said one substation for releasing said selected concentrator trunk to which said substation is connected.

5. A remote telephone line concentrator system including a central office, a plurality of trunks extending from said office, a plurality of number group conductors extending from said office, a larger plurality of substations remote from said office, individual switching units disposed along the longitude of said trunks and conductors contiguous to said substations, means in said switching units responsive to a service request condition at one of said substations for applying a group of momentary signals to said number group conductors indicative of the identity of said service requesting substation, and means at said central office for precluding access to a concentrator trunk by a substation line having a permanent condition thereon.

6. A remote telephone line concentrator system including a telepheone central office, a plurality of speech trunks extending from said office, a plurality of number group conductors including a number group return conductor and a release conductor extending from said office, a plurality of substations greater in number than said trunks and remote from said office, a plurality of switching units individual and contiguous to said substations, said units including means for connecting each of said substations to selected number group conductors in accordance with a code and for connecting each of said substations to said number group return conductor and said release conductor, first and second crosspoint means for connecting said substations to said trunks, signaling means in said switching units responsive to a service request condition at said substations for applying a distinct group of pulses to said number group conductors in accordance with the concentrator number of said substations, means at said central office connected to said number group conductors and responsive to said pulses to identify said service requesting substations, and means at said central office for releasing said crosspoint means over said release conductor.

7. A remote telephone line concentrator system for connecting a plurality of substations over a lesser plurality of trunks to a telephone central office comprising remote switching units individual to said substations and physically disposed in a multiplicity of distinct locations contiguous to said substations, means at said switching units including magnetic reed relay means for connecting said substations to said trunks under control of said central office, said magnetic reed means including permanent magnet latching means for maintaining said relay means in the operated or released condition, and magnetic reed call start relay means at said switching units responsive to a service request indication at said substations for delivering a distinctive group of pulses representative of the identity of said substation to said central office.

8. A remote line concentrator system for connecting a plurality of substations over a lesser plurality of trunks to a telephone central office comprising a plurality of remote switching units individual to said substations, said units being physically disposed in a multiplicity of distinct locations proximate to said substations, a plurality of number group conductors coupling said units to said central office, said units including magnetic reed relay crosspoint means for connecting said substations to said trunks under control of said central office, permanent magnet latching means for maintaining said crosspoint means operated or released, magnetic reed call start relay means responsive to a service request indication at one of said substations for applying a distinctive group of pulses representative of the identity of said calling station to said number group conductors, and cut-off means jointly operative with said crosspoint means under control of said central office for disconnecting said substation from number group conductors.

9. A telephone line concentrator system in accordance with claim 8 wherein said cut-off means includes a magnetic reed relay having latching means for maintaining said relay in the operated or released condition indefinitely without additional power supply.

10. A telephone line concentrator system for connecting a plurality of substations over a smaller plurality of trunks to a telephone central office including a plurality of remote switching units individual to said substations and disposed in a multiplicity of physically distinct locations proximate to said substations, said units including means for connecting said substations to said trunks under control of said central office, signaling means at said units responsive to a service request indication at one of said substations for delivering a distinctive group of pulses to said central office representative of said service requesting substation, and additional means at said units for controlling the duration of said pulses wholly autonomously.

11. A telephone line concentrator system for connecting a plurality of substations over a smaller plurality of trunks to a telephone central office including a plurality of remote switching units individual to said substations and disposed in a multiplicity of physically distinct locations proximate to said substations, said units including means for connecting said substations to said trunks under control of said central office, signaling means at said units responsive to a service request indication at one of said substations for delivering a distinctive group of pulses to said central office representative of said service requesting substation, and additional means at said units for controlling the duration of said pulses wholly autonomously, said means for controlling the duration of said pulses including a capacitor timing circuit in serial connection with said signaling means.

12. A telephone line concentrator system for connecting a plurality of substations over a lesser plurality of trunks to a telephone central office including means at said central office responsive to a service request indication at one of said substations for connecting one of said trunks to said service requesting substation, and additional means at said central office operative upon the persistence of said service request indication for a predetermined period of time without further signaling information from said substation for releasing said one trunk.

13. A distributed telephone line concentrator system for connecting a plurality of substations over a lesser plurality of trunks to a telephone central office comprising remote switching means individual and contiguous to said substations and physically disposed in a multiplicity of locations along the longitude of said trunks proximate to said substations, means at said central office responsive to a service request indication at one of said substations for extending a connection over a selected trunk to said service requesting substation, means at said central office operable in response to the persistence of said service request condition at said substation for a predetermined period of time without further signaling information from said substation for releasing said selected trunk, and additional means at said central office for precluding access thereafter by said one substation to any of said trunks.

14. A distributed telephone line concentrator system including a central office, a plurality of signaling conductors and a plurality of speech trunks extending in parallel from said central office, a plurality of substations greater in number than said trunks and remotely located from said central office and from each other, a plurality of concentrator units individual to said substations and disposed in a multiplicity of areas along the longitude of said trunks and number group conductors in accordance with the physical location of said substations, said units including means for joining said substations to said signaling conductors in accordance with a code and switching means for connecting said substations to said speech trunks, signaling means at said units responsive to a service request indication at one of said substations for energizing the signaling conductors to which said substation is connected with a group of momentary pulses, said signaling means including means for timing the duration of said pulses exclusive of control from said central office, and means at said central office responsive to said service request pulses for extending a connection to said service requesting substation.

15. A distributed telephone line concentrator system in accordance with claim 14 wherein said switching means include a pair of magnetic reed elements individual to said trunks at said concentrator units for connecting said substations to said trunks, permanent magnet latching means disposed adjacent to said elements for maintaining the contacts of said elements in the operated or released position indefinitely, and common release means disposed adjacent to said elements for simultaneously releasing any elements previously operated.

16. A distributed telephone line concentrator system in accordance with claim 15 including in addition number group relay means comprising a pair of magnetic reed elements connected to said signaling conductors and to said switching means and operative jointly with said switching means to disconnect said substation from said signaling conductors.

17. A telephone line concentrator system for connecting a plurality of remote substations over a lesser plurality of trunks to a telephone central office comprising remote switching means individual to said substations and physically disposed in a multiplicity of distinct locations contiguous to said substations, a plurality of signal conductors extending from said central office to said substations, means at said switching means responsive to a service request indication at the associated individual substation for delivering a distinctive group of pulses to said signaling conductors in accordance with a code representing the identity of said service requesting substation, means at said central office for extending a connection to said service requesting substation over an idle one of said trunks, and additional means at said central office responsive to a subsequent service request indication over said signal conductors prior to the extension of said connection over said idle trunk for registering the identity of said subsequent service requesting substation.

18. A telephone line concentrator system including a central office, a plurality of number of group conductors, a plurality of speech trunks, a number group return conductor and a release conductor extending in parallel from said office, a plurality of substations greater in number than said trunks remotely located from said central office and from each other, a plurality of remote concentrator devices individual to said substations and disposed along the longitude of said trunks and conductors in accordance with the relative physical location of said substations for connecting said substations to said speech trunks in accordance with control signals from said central office, and for connecting said substations to said number group conductors, return conductor and release conductor in accordance with a code, said devices including first and second magnetic reed elements and permanent magnet latching means disposed in proximity to said elements to maintain said elements operated or released indefinitely.

19. A distributed telephone line concentrator system in accordance with claim 18 including in addition means at said central office responsive to an originating call at one of said substations for applying marking potentials to said number group conductors and to a selected idle speech trunk, and winding means on said magnetic elements connected to said speech trunks and signal conductors operative in response to said marking potentials to actuate said magnetic elements.

20. A distributed telephone line concentrator system in accordance with claim 19 including in addition means at said central office responsive to a disconnect indication at one of said substations for applying marking potentials to said number group conductors and to said release conductor to release said magnetic elements at said disconnecting substation.

21. A distributed telephone line concentrator system in accordance with claim 20 including in addition electromagnetic means at said remote devices responsive to said marking potentials on said trunk conductors and said release conductor to release selected magnetic reed elements previously operated.

22. A telephone line concentrator system for connecting a plurality of remote substations over a smaller plurality of shared trunks and signal conductors to a telephone central office including means at said central office for extending connections to said substations, and additional means at said central office responsive to a plurality of service request indications at said remote substations transmitted over said signal conductors for registering the identity of said substations prior to the extension of a connection over said trunks to any of said substations.

References Cited in the file of this patent

UNITED STATES PATENTS

| | | |
|---|---|---|
| 2,599,358 | Cahill et al. | June 3, 1952 |
| 2,892,037 | Feiner | June 23, 1959 |
| 2,894,073 | Blount et al. | July 7, 1959 |
| 2,976,367 | Bruce et al. | Mar. 21, 1961 |
| 2,979,571 | Libois et al. | Apr. 11, 1961 |